United States Patent
Klaus-Nietrost et al.

(10) Patent No.: US 11,828,005 B2
(45) Date of Patent: *Nov. 28, 2023

(54) METHOD OF PRODUCING A CHEMICAL PULP FROM A TEXTILE MATERIAL WHICH COMPRISES CELLULOSE AND A MOLDED BODY FROM THE CHEMICAL PULP

(71) Applicant: LENZING AKTIENGESELLSCHAFT, Lenzing (AT)

(72) Inventors: Christoph Klaus-Nietrost, Vöcklabruck (AT); Richard Herchl, Ried im Innkreis (AT); Christian Weilach, Vöcklabruck (AT)

(73) Assignee: Lenzing Aktiengesellschaft, Lenzing (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,941

(22) Filed: Dec. 2, 2022

(65) Prior Publication Data

US 2023/0096086 A1    Mar. 30, 2023

Related U.S. Application Data

(63) Continuation of application No. 16/962,504, filed as application No. PCT/EP2019/050757 on Jan. 14, 2019, now Pat. No. 11,519,104.

(30) Foreign Application Priority Data

Jan. 15, 2018    (EP) .................................... 18151697

(51) Int. Cl.
   *B02C 18/00*    (2006.01)
   *B29B 17/02*    (2006.01)
   (Continued)

(52) U.S. Cl.
   CPC .......... *D01F 13/02* (2013.01); *B02C 18/0084* (2013.01); *B02C 18/0092* (2013.01);
   (Continued)

(58) Field of Classification Search
   CPC . B02C 18/00; B02C 18/0084; B02C 18/0092; B29B 17/02; B29B 2017/0217;
   (Continued)

(56) References Cited

U.S. PATENT DOCUMENTS 3,801,273 A    4/1974 Mays
3,937,671 A    2/1976 Gruntfest et al.
(Continued)

FOREIGN PATENT DOCUMENTS

DE    44 09 335 A1    9/1994
DE    198 82 319 T1    7/2000
(Continued)

OTHER PUBLICATIONS

International Search Report of corresponding PCT/EP2019/050757, dated Mar. 15, 2019, 5 pages.
(Continued)

*Primary Examiner* — Leo B Tentoni
(74) *Attorney, Agent, or Firm* — Lewis Roca Rothgerber Christie LLP

(57) ABSTRACT

A method of producing a chemical pulp from a textile material which comprises cellulose for manufacturing regenerated cellulosic molded bodies, wherein in the method the textile material is comminuted, at least a part of non-fiber-constituents of the comminuted textile material is separated from fiber-constituents of the comminuted textile material, at least a part of non-cellulosic fibers of the fiber-constituents is mechanically separated from cellulosic fibers of the fiber-constituents, at least a further part of the non-cellulosic fibers is chemically separated from the cel- (Continued)

lulosic fibers, and producing regenerated molded bodies from the chemical pulp based on the cellulosic fibers after mechanically separating and chemically separating.

17 Claims, 3 Drawing Sheets

(51) Int. Cl.

| | |
|---|---|
| *B29B 17/04* | (2006.01) |
| *D01D 5/06* | (2006.01) |
| *D01F 2/02* | (2006.01) |
| *D06L 4/00* | (2017.01) |
| *D01F 13/02* | (2006.01) |
| *C08B 16/00* | (2006.01) |
| *C08J 11/08* | (2006.01) |
| *D01F 2/06* | (2006.01) |
| *B29K 105/26* | (2006.01) |

(52) U.S. Cl.
CPC .............. *C08B 16/00* (2013.01); *C08J 11/08* (2013.01); *D01D 5/06* (2013.01); *D01F 2/02* (2013.01); *D01F 2/06* (2013.01); *B29B 2017/0217* (2013.01); *B29B 2017/0224* (2013.01); *B29B 2017/0231* (2013.01); *B29B 2017/0234* (2013.01); *B29B 2017/0244* (2013.01); *B29B 2017/0248* (2013.01); *B29B 2017/0255* (2013.01); *B29B 2017/0265* (2013.01); *B29B 2017/0272* (2013.01); *B29B 2017/044* (2013.01); *B29B 2017/0424* (2013.01); *B29B 2017/0468* (2013.01); *B29B 2017/0476* (2013.01); *B29K 2105/26* (2013.01)

(58) Field of Classification Search
CPC .... B29B 2017/0224; B29B 2017/0231; B29B 2017/0234; B29B 2017/0244; B29B 2017/0248; B29B 2017/0255; B29B 2017/0265; B29B 2017/0272; B29B 17/04; B29B 2017/0424; B29B 2017/044; B29B 2017/0468; B29B 2017/0476; B29K 2105/26; D01D 5/06; D01F 2/02; D01F 2/06; D06L 4/00
USPC ............ 264/140, 187, 188, 203, 914; 8/137; 241/20, 24.1, 24.11, 24.12, 24.18, 24.2, 241/24.21, 24.28, 24.29
See application file for complete search history.

(56) References Cited

U.S. PATENT DOCUMENTS

| | | | |
|---|---|---|---|
| 4,246,221 A | 1/1981 | McCorsley | |
| 4,345,039 A | 8/1982 | Cowan et al. | |
| 5,240,530 A | 8/1993 | Fink | |
| 5,598,980 A | 2/1997 | Dilly-Louis et al. | |
| 5,601,767 A | 2/1997 | Firgo et al. | |
| 5,722,603 A | 3/1998 | Costello et al. | |
| 6,258,304 B1 | 7/2001 | Bahia | |
| 2015/0329771 A1 | 11/2015 | Danielec et al. | |
| 2016/0097158 A1 | 4/2016 | Henriksson et al. | |

FOREIGN PATENT DOCUMENTS

| | | |
|---|---|---|
| DE | 696 18 988 T2 | 9/2002 |
| EP | 0 205 346 B1 | 12/1986 |
| EP | 0 636 646 A1 | 2/1995 |
| EP | 0 681 896 A1 | 11/1995 |
| EP | 3 339 504 A1 | 6/2018 |
| EP | 3 511 140 A1 | 7/2019 |
| WO | WO 96/07778 A1 | 3/1996 |
| WO | WO 97/021490 A2 | 6/1997 |
| WO | WO 02/40766 A2 | 5/2002 |
| WO | WO 2013/182801 A1 | 12/2013 |
| WO | WO 2014/045062 A1 | 3/2014 |
| WO | WO 2014/086579 A1 | 6/2014 |
| WO | WO 2015/077807 A1 | 6/2015 |
| WO | WO 2016/123643 A1 | 8/2016 |
| WO | WO 2017/019802 A1 | 2/2017 |

OTHER PUBLICATIONS

Written Opinion of corresponding PCT/EP2019/050757, dated Mar. 15, 2019, 6 pages.
Search Report of corresponding EP 18151697.2, dated Jun. 29, 2018, 6 pages.
Office Action of corresponding TW application 108101351, dated Mar. 19, 2020, 26 pages with English translation.
Ouchi, et al., "A new methodology to recycle polyester from fabric blends with cellulose," Cellulose 17.1 (2010), pp. 215-222.
Golova, et al., "Structure—Properties Interrelationships in Multicomponent Solutions Based on Cellulose and Fibers Spun Therefrom," Cellulose—Fundamental Aspects, chapter 13, 2013, pp. 303-342.
Scholz, "Thermoplastisches Polyurethan," Index I FAPU 15, Nov./Dec. 2002 I Fachartikel, 4 pages.
Tausif, et al., "Mechanical Properties of Nonwoven Reinforced Thermoplastic Polyurethane Composites," Materials 2017, 10, 618, 13 pages.
"Einzigartig wie ein Fingerabdruck", Markt & Technik 38/2013, 2 pages.

METHOD OF PRODUCING A CHEMICAL PULP FROM A TEXTILE MATERIAL WHICH COMPRISES CELLULOSE AND A MOLDED BODY FROM THE CHEMICAL PULP

CROSS-REFERENCE TO RELATED APPLICATION

This application is a continuation of U.S. patent application Ser. No. 16/962,504, filed on Jul. 15, 2020, now U.S. Pat. No. 11,519,104, which is National Phase Patent Application and claims priority to and the benefit of International Patent Application No. PCT/EP2019/050757, filed Jan. 14, 2019, which claims priority to and the benefit of European Patent Application No. EP 18151697.2, filed Jan. 15, 2018, the entire contents of all of which are incorporated herein by reference.

FIELD OF INVENTION

The invention concerns a method of producing a chemical pulp from a textile material which comprises cellulose, and a regenerated molded body from the chemical pulp.

BACKGROUND

As viscose fibers, chemical fibers and regenerated fibers are denoted, which are manufactured by means of a wet spinning method which is called viscose-method. The starting raw material of the viscose-method is cellulose which is provided on the basis of wood. From this starting raw material wood, the highly pure cellulose in form of chemical pulp is obtained. In subsequent process stages, the pulp is first treated with caustic soda, whereby alkali cellulose is formed. In a subsequent conversion of said alkali cellulose with carbon disulfide, cellulose-xanthogenate is formed. From this, by further supplying caustic soda, the viscose-spinning solution is generated which is pumped through holes of shower-like spinning nozzles into a spinning bath. There, one viscose-filament per spinning nozzle hole is generated by coagulation. The such manufactured viscose-filaments are subsequently cut to viscose-staple fibers.

Lyocell denotes a regenerated fiber type comprising cellulose, which is manufactured according to a direct solvent method. The cellulose for the lyocell-method is extracted from the raw material wood. The such obtained pulp may subsequently be solved in N-methylmorpholine-N-oxide (NMMO), a solvent, by dehydration without chemical modification, filtered, and subsequently pressed through spinning nozzles. The such formed filaments, after passing an air gap, are precipitated in a bath with an aqueous NMMO-solution and are subsequently cut to staple fibers.

Thus, both in the lyocell-method and in the viscose-method, the raw material wood and pulp manufactured therefrom, respectively, is conventionally predominantly utilized.

SUMMARY

It is an object of the present invention to sustainably and ecologically manufacture molded bodies from a chemical pulp which comprise cellulose in an efficient manner.

This object is solved by the subject matter according to the independent patent claim. Preferred embodiments result from the dependent patent claims.

According to an embodiment of the present invention, a method of reusing (or recycling) a textile material which comprises cellulose for generating a chemical pulp used for manufacturing regenerated cellulosic molded bodies (in particular consisting of cellulose) is provided, wherein in the method the textile material is comminuted, at least a part of non-fiber-constituents of the comminuted textile material is separated from fiber-constituents of the comminuted textile material, at least a part of non-cellulosic fibers of the fiber-constituents is mechanically separated from cellulosic fibers of the fiber-constituents, at least a further part of the non-cellulosic fibers is chemically separated from the cellulosic fibers, and the molded bodies are generated from the chemical pulp based on the cellulosic fibers after mechanically separating and chemically separating.

In the context of this application, the term "cellulose" may in particular denote an organic compound which is a constituent of plant cell walls or can be manufactured synthetically. Cellulose is a polysaccharide (i.e. a multiple sugar). Cellulose is unbranched and typically comprises multiple hundred up to ten thousands p-D-glucose molecules ($\beta$-1,4-glycosidic linkage) and cellobiose-units, respectively. From cellulose molecules, cellulose fibers are built by plants in a controlled manner. By means of a technical process, cellulose molecules can be agglomerated under formation of regenerated fibers, for example as tearproof fibers.

In the context of this application, the term "molded body" may in particular denote a two-dimensional or three-dimensional geometric body which is a result of a method of manufacturing and recovery, respectively, of cellulose. In particular, a molded body denotes a two-dimensional or three-dimensional object which comprises cellulose or consists of it and is manufactured from solved pulp. Molded bodies in particular may be lyocell-molded bodies, viscose-molded bodies or modal-molded bodies. Typical molded bodies are filaments, fibers, sponges and/or films. Basically, all types of cellulose molded bodies are suitable for embodiments of the invention. Both endless filaments and cut staple fibers with conventional dimensions (for example 38 mm length) and short fibers are considered as fibers. For manufacturing fibers, both methods with withdrawing devices downstream of one or more extrusion nozzles, and also other methods, as in particular melt-blowing-methods, are possible. Alternatively to fibers, a foil which comprises cellulose can be manufactured as molded body, i.e. a planar and substantially homogenous film with or made of cellulose. Foils may be in particular manufactured by adjusting the process parameters of a lyocell-method such that coagulating is at least partially triggered only after the filaments impinge on a receiving surface. Planar cellulose molded bodies are considered as foils, wherein the thickness of these foils is adjustable (for example by selecting a number of serially arranged nozzle beams). Other embodiments of a molded body are a tissue and a fleece made of cellulose filaments and cellulose fibers, respectively, in particular a spinning fleece made of integrally merged ("merging") substantially continuous cellulose filaments ("melt blown"). Here, in particular a textile planar structure made of at least two (preferably orthogonal or almost orthogonal) crossed thread systems (or fiber systems) may be considered as a tissue, wherein threads (or fibers) in longitudinal direction may be denoted as warp threads and threads (or fibers) in a transverse direction may be denoted as weft threads. A fleece or nonwoven may be denoted as disordered (in particular present in random orientation) structure of filaments or fibers or cut yarn with limited length which are joined together to a fiber layer or a fiber web and which are connected to each other (in particular in a frictionally engaged manner). A molded body may also be generated in the form of a sphere. As molded body, also cellulose-comprising particles, as in particular beads (i.e. a granulate and spherules, respectively) or flakes may be provided which can be further processed in this form. Thus, possible cellulose molded bodies are also particulate structures as granulate, spherical powders or fibrids. A shaping of a molded body is preferably performed by extrusion of a spinning solution which contains cellulose through an extrusion nozzle, since large amounts of cellulose molded bodies with a very uniform shape can be manufactured in this way. A further possible cellulose molded body is a sponge or, more general, a porous molded body. According to exemplary embodiments, the mentioned molded bodies can be used for manufacturing yarns, textiles, gels or composite materials, for example.

In the context of this application, the term "textile material" in particular may denote textile raw materials, textile structures manufactured therefrom, and finished articles and products, respectively, which in turn are manufactured therefrom. Textile raw materials may in particular be natural fibers and/or chemical fibers, in particular comprising or consisting of cellulose. In textile material, also non-textile raw materials may be additionally contained, which may be processed to line-shaped, planar, and spatial structures by different methods. Thus, from the raw materials, in particular line-shaped textile structures (for example yarns or twines), planar textile structures (for example tissue, meshes, fleece textiles and felts), and spatial textile structures (for example textile tubes, socks or textile semifinished products) may be manufactured. Textile materials in form of products or finished articles may be provided to a further fabricator or consumer using the previously mentioned products.

In the context of the present application, the term "mechanically separating" may in particular denote at least one separation procedure, wherein a separating of mixtures with different properties from each other or out of a carrier medium is performed. Possible mechanical separating methods for substances out of a carrier medium may be filtering, sedimenting, and separating in a centrifugal force separator. Possible methods for separating substances with different properties may be floating, sieving, a separation by density or other properties, such as magnetism, conductivity, surface, etc.

In the context of this application, the term "chemically separating" may in particular denote at least one separation procedure which uses a chemical separation mechanism, wherein at least one of the species to be separated may be chemically converted to another substance during the separation. In particular, in a chemical separation, a species (for example non-cellulosic fibers) may be selectively degraded with respect to another species (for example cellulosic fibers). Thus, in chemical separating methods, substances or compounds may be separated by means of chemical properties and chemical reactions. Examples for chemical separating methods are separation due to different solubility, separation due to the chemical structure, etc.

In the context of this application, the term "fiber-constituents" and "fiber-related constituents" may in particular denote constituents (for example comminuted textile pieces) of the textile material which are completely or substantially consisting of fibers or comprise at least a highly predominant part of fiber material (for example at least 80 weight percent fibers, further in particular at least 90 weight percent fibers). The term "fiber-like constituents" correspondingly relates to constituents of the textile material which are characterized by fibers and which at the most to a minor part comprise constituents which do not show a fiber character. For example, fibers of textile material may comprise cellulose fibers, such as lyocell-fibers, viscose-fibers and/or cotton fibers. Moreover, the fibers may also comprise synthetic fibers, for example polyester and/or elastane.

In the context of this application, the term "non-fiber-constituents" and "non-fiber-related constituents" may in particular denote constituents (for example comminuted textile pieces) of the textile material, which are exclusively or substantially not consisting of fiber material or comprise at least a highly predominant part of materials which are different from fiber material (for example at most 20 weight percent fibers, further in particular at most 10 weight percent fibers). Non-fiber-constituents of textile material may for example comprise buttons and zip fasteners.

According to an exemplary embodiment of the invention, a method of manufacturing molded bodies which comprise cellulose from textile materials to be recycled, preferably old clothes and/or textile manufacturing remains, is provided. Although such starting materials are typically present as textile mixed tissue with a high degree of inhomogeneity of its composition and with a high portion of foreign matters (for example polyester seams and elastane fibers) and foreign bodies (for example buttons and zip fasteners) and thus conventionally were not considered for manufacturing cellulose-molded bodies with a high purity, according to the described method, molded bodies may also be manufactured on basis of old clothes, yarn wastes, offcut remains and the like. In a corresponding method, the textile materials may at first be comminuted. Thereafter, large foreign bodies which are not present in form of fibers may be separated to at least a large part. The remaining fiber-constituents may then at first be made subject to a mechanical treatment for mechanically separating cellulose fibers with respect to other fibers, and subsequently to a chemical treatment for chemically separating the cellulose fibers with respect to other fibers which still remain after the mechanical treatment. The result are relatively pure cellulose constituents from which chemical regenerated fibers may be generated (for example by the lyocell-method or by the viscose-method). This procedure is simple, ecological and with advantage applicable in an industrial scale. In the described manner, it is efficiently enabled to sustainably manufacture molded bodies which comprise cellulose from reused textile material.

In the following, additional embodiments of the method are described.

According to an embodiment, comminuting the textile material may comprise shredding. In particular, the textile material may be comminuted (for example using at least one guillotine) to textile pieces with an average size of a few centimeters, for example. It has turned out that the such comminuted textile material is highly suitable to subsequently separate fiber-constituents from non-fiber-constituents.

According to an embodiment, in the separating of at least a part of non-fiber-constituents, foreign matters of a group may be separated from the rest of the textile material, which group is consisting of buttons, zip fasteners, seams and textile print. A separating criterion may be the size and/or a material of the non-fiber-constituents, for example.

According to an embodiment, the separating of the non-fiber-constituents from the fiber-constituents may be performed due to different physical properties, in particular by metal depositing and/or gravitationally depositing. Metal components (for example zip fasteners, rivets, etc.) may be separated due to their magnetic properties, for example. Also different influences of the gravitational force on different constituents may be utilized for separating.

According to an embodiment, mechanically separating may be performed based on density differences between the non-cellulosic fibers and the cellulosic fibers. For example, in a centrifuge, materials with different density may be separated due to differently strong centrifugal forces. After transferring the constituents in a liquid medium, they may partially accumulate at the surface due to different densities, while other constituents are floating or sedimenting at a bottom.

According to an embodiment, mechanically separating may be performed based on different electrostatic properties between the non-cellulosic fibers and the cellulosic fibers. Due to different electrostatic properties, the different fibers may react to an applied electric field in a different manner. This in turn allows for separating the cellulosic fibers with respect to the non-cellulosic fibers.

According to an embodiment, mechanically separating may comprise suspending (i.e. transferring in a suspension) the fiber-constituents in a liquid medium, in particular an aqueous medium, and separating the non-cellulosic fibers from the cellulosic fibers due to different physical properties in the liquid medium (in particular different gravitational, centrifugal force-related, flotational and/or electrostatic properties). Also when the different fibers in a liquid medium show a different behavior due to their different composition, this enables to separate the different fiber-constituents.

According to an embodiment, the liquid medium may comprise at least one additive for increasing the different physical properties, in particular a dispersing agent and/or a swelling agent. A dispersing agent or dispersant may in particular denote additives which enable or stabilize the dispersing, i.e. a fine distribution of a substance (for example a fiber) in a continuous medium (for example in a liquid). A swelling agent may in particular denote additives which promote a swelling of a substance. Smelling may denote a process, wherein a substance (in particular a liquid) enters into a solid body and causes an increase of the volume of the latter. When one or more of such additives are added to the medium, the discrepancies in the properties of the diverse fibers, which are required for mechanically separating the different fibers, may be increased. This increases the efficiency of the separation.

According to an embodiment, chemically separating may comprise selectively solving at least a part of the non-cellulosic fibers or only at least a part of the cellulosic fibers in a solvent, and separating, in particular filtering, at least a part of the non-solved fiber-constituents. In other words, the different fibers may be supplied to a (for example liquid, in particular aqueous) medium in which only certain ones of these fibers, in particular selectively polyester fibers, are distinctly solved, whereas other fibers, in particular cellulose fibers, do not show any or only a weaker solving behavior. The fibers which are not solved, or not solved in a noteworthy manner, or solved in a weaker manner (in particular cellulose fibers), may be filtered or centrifuged and may thus be further processed separated from the solved fibers.

According to an embodiment, mechanically separating and/or chemically separating may comprise separating synthetic fibers as non-cellulosic fibers. In the reused textile materials, in particular old clothes and/or textile wastes, non-cellulosic fibers with a synthetic origin frequently occur. As examples for such synthetic fibers, polyester, polyamide and/or elastane may be mentioned. They can effectively be separated from cellulose fibers by the here described method.

According to an embodiment, chemically separating may comprise supplying an alkaline solution, in particular using oxidizing agents, in particular an alkaline cooking. In particular, supplying the alkaline solution for degrading non-cellulosic fibers, in particular synthetic fibers, further in particular polyester fibers, may be performed. Especially polyester may thereby be split to water-soluble constituents which may be separated from the cellulose fibers by the wastewaters which occur in the process.

According to a preferred embodiment, the alkaline cooking of the cellulose-based (in particular cotton-based) textile material which is preprocessed as described, from which the cellulosic fibers are enriched (i.e. mainly cellulosic fibers are recovered), for generating further purified solved pulp may be further processed as follows: the fibers, in particular the already enriched cellulosic (or mainly cellulosic) fibers, may be treated with an alkaline solution (for example potassium hydroxide) in combination with a gaseous oxidation agent (for example 02) in a pressure container (preferably at a pH value of at least 9), namely:
  a) at a temperature between 90° C. and 185° C.;
  b) for an incubation time of 45 minutes to 270 minutes;
  c) in the presence of a cellulose-stabilizing additive (for example a magnesium salt, preferably magnesium sulfate; or a chelating compound on basis of a transition metal, for example ethylenediaminetetraacetic acid (EDTA)), preferably in a concentration in a range between 0.01 weight percent and 5 weight percent with respect to the supplied fibers;
  d) at an alkali-concentration in a range between 1 weight percent and 35 weight percent with respect to the supplied fibers;
  e) at an initial gas pressure in a range from 1 bar to 21 bar (correspondingly approximately 0.1 MPa to approximately 2.1 MPa).

The generated solved pulp may then be made subject to a washing procedure.

A partial degradation of the cellulose fibers in the chemical milieu may then be advantageously controlled by influencing the chemical environment, such that a resulting degree of polymerization of the cellulose is within a desired interval. It should be noted that a DP-value (wherein DP denotes the average degree of polymerization, i.e. the number of monomer units per macromolecule) in the solvent NMMO which is preferably utilized when the molded bodies are generated from the recovered cellulose, may be adapted for achieving a good solving behavior in NMMO. Typical values for DP-values for recyclates are below 2000 mL/g, preferably below 1000 mL/g, especially preferred below 800 mL/g. The mentioned values relate to the limiting viscosity number (GVZ, which correlates with the degree of polymerization of the cellulose) in units of mL/g. By optional, but advantageous additional measures, such as selection, mixing, cooking, etc., a GVZ-value in the range from 200 mL/g to 700 mL/g may be achieved, which is especially suitable for the lyocell-process.

According to an embodiment, chemically separating may comprise converting at least a part of the non-cellulosic fibers to soluble, in particular water-soluble, substances, solving the soluble substances in a solvent, in particular an aqueous solvent, and separating, in particular filtering, non-solved cellulosic fibers from the solved substances. Thus, the different fibers may be supplied to a (for example aqueous) solvent, in which only non-cellulosic fibers are distinctly solved. The fibers which are not solved or are not noteworthy solved or are weaker solved (in particular cellulose fibers), may be filtered or centrifuged and may then be further processed separated from the solved fibers.

According to an embodiment, generating the molded bodies may be performed based on the cellulosic fibers by the lyocell-method or by the viscose-method.

In the context of this application, the term "lyocell-method" may in particular denote a method of manufacturing cellulose according to a direct solvent method. The cellulose for the lyocell-method can be obtained from a starting material which contains said cellulose. In the lyocell-method, the starting material can be solved in a suitable solvent (in particular comprising tertiary amine oxides, such as N-methylmorpholine-N-oxide (NMMO) and/or ionic liquids, i.e. low-melting salts made of cations and anions). Solving may be performed in particular by dehydration and/or without chemical modification. The obtained solution, which may be also denoted as dope or spinning solution, may subsequently be pressed through one or more spinning nozzles in the lyocell-method. Thereby formed filaments can be precipitated during and/or after their free or controlled fall through an air gap in a water containing bath (in particular in a bath with aqueous NMMO-solution) and/or in the air humidity present in the air gap.

In the context of this application, the term "viscose-method" may in particular denote a method of manufacturing cellulose according to a wet spinning method. The cellulose for the viscose-method can be obtained from a starting material (in particular wood or a wood pulp) which contains said cellulose. In subsequent process stages in the viscose-method, the starting material can first be treated with a base (for example caustic soda), whereby alkali cellulose is formed. In a subsequent conversion of said alkali cellulose with carbon disulfide, cellulose-xanthagonate is formed. From this, by a further supply of a base (in particular caustic soda), a viscose-spinning solution can be produced which can be pressed through one or more spinning nozzles. In a spinning bath, viscose-filaments are generated by coagulation.

According to an embodiment corresponding to the lyocell-method, generating the molded bodies may comprise solving the cellulosic fibers in a solvent, and transferring the solved cellulosic fibers in a spinning mass, and extruding the spinning mass through spinning nozzles to the molded bodies, and precipitating the extruded molded bodies in a spinning bath. Between solving and precipitating, a lyocell-spinning solution which is manufactured by solving may be guided through nozzles and may be spun to molded bodies there.

According to an embodiment, solving the cellulosic fibers may be performed by a direct solving method and/or by tertiary amine oxides, in particular N-methylmorpholine-N-oxide, as solvent. Descriptively, in such a direct solving method, the cellulose is physically solved in the respective solvent. Preferably, tertiary amine oxides are utilized as solvent, especially preferred N-methylmorpholine-N-oxide (NMMO).

According to an embodiment, diluting the solved cellulosic fibers may be caused by an aqueous milieu (in particular comprising a water bath, further in particular substantially consisting of water or a mixture of water and solvent). Descriptively, in the lyocell-method, the concentration of the solvent which caused the cellulose to solve, is reduced by the water to such an extent, that the obtained diluted solution sinks below the solubility limit of cellulose and the cellulose is therefore precipitated and deposited, respectively. The coagulation medium (i.e. in particular the water bath) may be substantially pure water or may be mixed with a solvent.

According to an embodiment, the method may comprise bleaching the chemically separated cellulosic fibers. Thereby, colorants may be removed. Such a bleaching may comprise an oxidative bleaching (i.e. a bleaching, wherein colorants are attacked by an oxidation, for example using oxygen or a compound with —O—O-group, for example hydrogen peroxide), a reductive bleaching (i.e. a bleaching, wherein the colorants are attacked by a reduction and/or transferred in a soluble form, in particular for removing vat dye, such as indigo) and/or and enzymatic bleaching (i.e. a bleaching, wherein colorants are attacked by enzymes, for example using proteases which biologically split proteins). An oxidative bleaching may be preferred, since it is able to effectively remove colorants and enables a simple process control.

According to a preferred embodiment, bleaching may be performed in three stages (in particular with one or more stages, for example with one, two, three, four, five, or more bleaching stages), for example by performing an acidic washing, (in particular subsequently) performing an ozone bleaching, and (in particular subsequently) performing a peroxide bleaching. By acidic washing, metal ions may be removed and/or textile chemicals which are not alkaline degradable may be degraded. Ozone bleaching may degrade colorants and with advantage may adjust the limiting viscosity number and thus the degree of polymerization of the cellulose. By peroxide bleaching, the adjustment of the degree of polymerization of the cellulose may be further refined.

According to an embodiment, the method may comprise, after separating at least a part of non-fiber-constituents, further comminuting the separated non-fiber-constituents, recovering fiber residues from the further comminuted non-fiber-constituents, and supplying the recovered fiber residues to the fiber-constituents and/or to mechanically separating. Cellulose-constituents may still be connected to the non-fiber-constituents. In order to achieve that these are not lost for an especially efficient recycling, the non-fiber-constituents may thus be made subject to a comminuting procedure again, to separate fiber remains therefrom, which may be supplied to the previously separated fiber-constituents.

According to an embodiment, the method may comprise, prior to mechanically separating, separating the fiber-constituents (and the recovered fiber remains and fiber residues, respectively, if required) to single fibers, in particular by tearing and/or milling. By reducing the constituents to the size of single fibers prior to mechanically and chemically separating, and by optionally shortening the single fibers, the efficiency of the subsequently separating of cellulosic fibers can be highly increased with respect to non-cellulosic fibers.

According to an embodiment, the method may comprise postprocessing the precipitated cellulose for obtaining the molded body. Such an optional postprocessing may for example comprise drying, impregnating, and/or reshaping the obtained cellulose. By a corresponding postprocessing, it is possible to finish the molded body manufacture at the end of the lyocell-method in an application-specific manner.

According to an embodiment, in the method, at most (or only exactly) a part of the non-cellulosic fibers, in particular only exactly a part of synthetic fibers made of polyester and/or elastane, from the textile material may be co-used for manufacturing the molded bodies.

According to an embodiment, a manufactured molded body may thus comprise elastane as foreign matter which, during solving the cellulose, is also at least partially solved. Elastane is used in many textiles, in particular clothes, further in particular old clothes, and may be intentionally retained in the molded body which comprises cellulose as foreign matter. It has turned out that elastane in a recycled cellulose-molded body does not negatively influence the product properties of the cellulose-molded body and therefore does not have to be elaborately removed from the starting material up to a maximum achievable limit, when a molded body is manufactured. It is even possible, by retaining elastane in a cellulosic molded body, to impart a certain elasticity to the latter. In this way, also molded bodies with modified elastic properties can be manufactured.

According to an embodiment, a manufactured molded body may comprise polyester as foreign matter which may be retained at least partially in the processed textile material when it is solved, in particular precipitated. Polyester is a foreign matter which can be frequently found in post-consumer-old clothes. According to an exemplary embodiment, at least a part of this polyester may remain in the manufactured cellulose-molded body. Descriptively, such a rest of polyester in the molded body may function similarly as a hot melt adhesive and may mechanically strengthen a fiber tissue and a fiber fleece, respectively, made of cellulose. Thereby, by at least partially retaining polyester in the cellulose-molded body, a mechanically especially robust cellulose material may be provided which may thereby also be provided with thermoplastic properties. Thus, according to such an embodiment, the polyester leads to an increased mechanical robustness and stability, respectively, of the manufactured molded body.

According to an embodiment, an inhomogeneous textile material, in particular a mixed tissue, may be used as textile material. According to a preferred embodiment, the product or the preform may at least partially be manufactured on basis of old clothes as cellulose source as starting material for manufacturing the product or the preform. For example, in the textile material, as starting material at least 3 weight percent, in particular at least 10 weight percent, further in particular at least 30 weight percent, preferably at least 50 weight percent, old clothes with respect to the total weight of the textile material may be used. Especially advantageously, reused old textiles for manufacturing the product may comprise or consist of items of clothing which have been worn by a user.

According to an embodiment, the textile material may comprise or consist of remains from a clothing manufacture and/or old clothes which in particular have been worn by a consumer. In particular, the starting material may comprise or consist of a cellulose source to be reused, may in particular completely or partially be made of remains from a clothing manufacture and/or from old clothes. In the context of this application, the term "cellulose source" may in particular denote a medium (in particular a solid body medium) which, as basis for manufacturing a molded body which comprises cellulose, during a corresponding manufacturing method, provides the cellulose material used for this purpose. An example is wood and wood pulp, respectively. Thus, also such starting materials can be introduced in the recycling-method which are not for the first time taken from a natural resource, such as wood, but origin from an already used product. Especially advantageous in this context is the use of post-consumer-old clothes after a use by a consumer, since such old clothes comprise a large reservoir of cellulose to be reused.

In the context of this application, the term "remains from a clothing manufacture" may in particular denote waste and/or offcut of a textile or yarn which comprises or consists of cellulose, wherein said remains occur during a method of manufacturing clothes. In the manufacture of clothing, for example a textile which comprises cellulose is manufactured as starting material, from which planar parts (for example in form of a half T-shirt) are cut. Remains are left, which can be resupplied to a method of manufacturing a molded body which comprises cellulose, according to an exemplary embodiment. Thus, remains from a clothing manufacture may be a starting material which comprises or consists of cellulose, which can be used for recovering cellulose before a consumer has used the remains as clothes or in any other way. In particular, the remains from a clothing manufacture may be made of substantially pure cellulose, in particular without foreign matters which are separate and do not comprise cellulose (as buttons, textile print or seams, for example).

In the context of this application, the term "old clothes" may denote clothes, in particular comprising cellulose, which have been already used (in particular worn) by a user when at least a part of the cellulose is recovered. Thus, old clothes may be a starting material comprising cellulose which may (but does not have to) comprise a substantial amount of foreign matters and which may be used for recovering cellulose, after a user has used the old clothes as clothing or in any other way. In particular, old clothes may be made of a mixture of cellulose and one or more foreign matters, in particular comprising (in particular frequently used in clothing) synthetic plastic (as polyester and/or elastane, for example) and/or foreign matters which are separate and do not comprise cellulose (such as buttons, textile print or seams). Polyester may in particular denote polymers with ester functions (R—[—CO—O—]—R) in their main chain. Polycarbonates and polyethylene terephthalate belong to polyesters. Elastane in particular denotes an extensible chemical fiber with a high elasticity. A block copolymer which is underlying elastane may contain 85% by weight polyurethane.

According to an embodiment, during the recovering method, the textile material may be at least partially freed from cross-linkers which are cross-linking fibers of the textile material. For example, this may be performed by an alkaline and/or acidic pretreatment, in particular dependent from the type of the present cross-linker. A corresponding cross-linker may disturb, since it may reduce the solubility of lyocell-cellulose in the lyocell-solvent. At least partially removing the cross-linker by means of a pretreatment (for example by performing an alkaline step and/or and acidic step) under partially or completely solving of the undesired cross-linking, may increase the suitability of the obtained cellulose as chemical pulp for the production of regenerated molded bodies.

According to an embodiment, the textile material for the recycling-method may be combined with another cellulose source. For example, the other cellulose source may comprise at least one material of a group which is consisting of wood pulp, rags pulp (in particular pulp from textile remains such as linen, rags, etc.), cotton (i.e. cellulose from a cotton plant, see FIG. 5), cellulose manufactured by a lyocell-method (see FIG. 3), and cellulose manufactured by a viscose-method (see FIG. 4). The other cellulose source may be added flexibly and dependent from the availability. Thereby, the industrial utilization of the lyocell-from-lyocell-method is not impaired by possible temporal bottlenecks of a certain cellulose source. Instead, it is possible to compensate and balance out, respectively, possible missing quantities of old clothes-cellulose by other cellulose sources. Forming the starting material exclusively from old clothes may be preferred.

The molded bodies manufactured according to the invention may be used as packaging material, fiber material, textile composite materials, fiber composite materials, fiber fleeces, needle felts, quilting cotton, tissues, knitted fabrics, home textiles such as bedclothes, as clothes, as filling textile, flocking substance, hospital textiles such as underlays, diaper or mattresses, as fabric for heating blankets, shoe inserts and wound dressings. Embodiments of the invention may be applicable in both different technical fields and in medicine and in cosmetics and wellness. In medicine, for example materials for wound treatment and wound healing may be made of a carrier which determines the mechanical properties and a biocompatible coating material which is especially compatible with the skin and with the surface of the wound. Many other applications are possible.

BRIEF DESCRIPTION OF THE DRAWINGS

In the following, exemplary embodiments of the present invention are described in detail with reference to the following figures.

DETAILED DESCRIPTION

Figure 1:
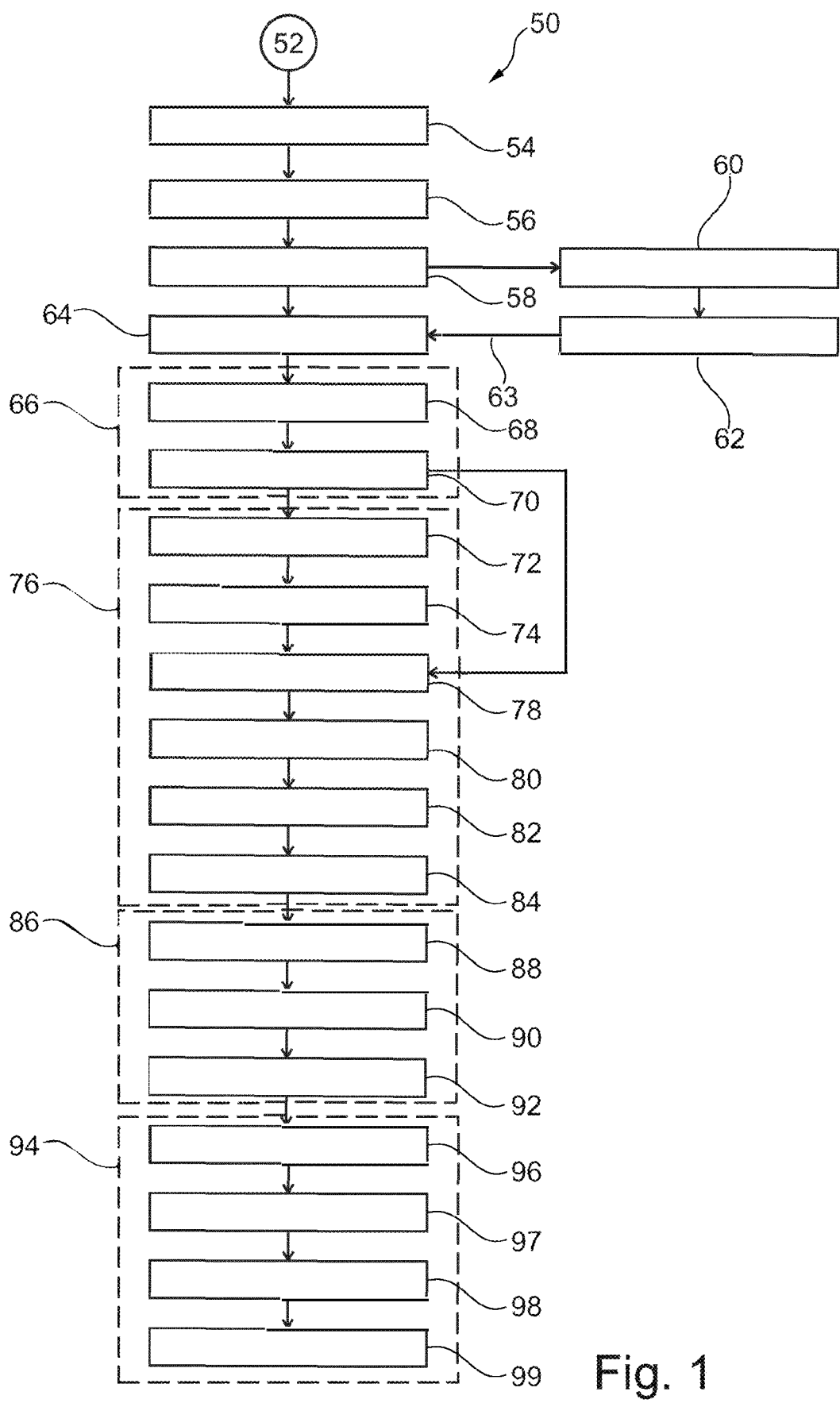
FIG. 1 shows a flow diagram of a method of reusing a textile material which comprises cellulose for manufacturing molded bodies according to an exemplary embodiment of the invention.

Same or similar components in different figures are provided with the same reference numbers.

Before, referring to the figures, exemplary embodiments are described, some basic considerations shall be summarized based on which exemplary embodiments of the invention have been derived.

According to an exemplary embodiment of the invention, a process for manufacturing molded bodies which comprise cellulose by recycling textile materials is described. In particular, in the following, process steps for processing textile materials in form of old textiles and textile wastes, respectively, to chemical pulp are described. By this process, advantageously the filamentary cellulosic components which are contained in the textile starting materials may be isolated and recovered, respectively, may be separated from non-cellulosic constituents, and may be purified according to the requirements to chemical pulp.

In the following, a selection of raw materials as textile material according to an exemplary embodiment is described.

For manufacturing chemical pulp, as textile material to be reused in particular such old textiles and textile wastes, respectively, may be used with advantage as raw materials which comprise a predominant portion of cellulosic constituents, such as cotton and/or cellulose-regenerated fibers (in particular lyocell-fibers, viscose-fibers, modal fibers). These textile materials and raw materials, respectively, may be selectively recovered by manual, partially automated or fully automated sorting methods from the total volume of occurring old textiles and/or other cellulose sources.

Preferably, raw materials may be selected as textile materials, which exclusively contain cellulosic components. Examples for this are production wastes (for example offcut remains from the confectioning). In contrast, textiles which are ready to use frequently comprise a portion of non-cellulosic fibers. Polyester-based sewing yarns are mentioned as example. In particular in the processing of old textiles, material mixtures thus have to be assumed which may be used as textile materials and starting materials, respectively, for the described method.

After selecting the textile materials, a separation of non-filamentary constituents and non-fiber-constituents, respectively, from filamentary constituents and fiber-constituents, respectively, and a disintegration of the raw materials and textile materials, respectively, may be performed.

In old textiles as starting material and textile material, respectively, non-filamentary components (in particular macroscopic non-filamentary components, i.e. not only microscopic components, such as pigment colorants) and non-fiber-constituents, respectively, such as buttons and/or zip fasteners, are frequently contained which cannot be removed at the beginning of the processing-process from the filamentary or fiber-constituents of the selected raw materials or textile materials. For this purpose, according to an exemplary embodiment, at first the textile materials which are presorted (for example by color, quality, purity, etc.) may be comminuted to textile pieces by one or more guillotines or by a cutting mill. For example, the comminuted textile pieces may be present as approximately 1 cm up to multiple centimeters large structures, for example with an average diameter in a range between 1 cm and 5 cm. Subsequently, it is possible to remove textile pieces at which non-filamentary components and non-fiber-constituents, respectively, are adhered or which are consisting of such materials, due to physical properties (for example by a metal separator, gravitationally, or in any other way) automatedly (in particular partially automatedly or fully automatedly) from the total flow. In order to reduce or to completely avoid fiber-losses, the such separated sub-pieces may be supplied to further comminuting stages and separation stages with advantage, and the thus recovered filamentary materials may be again supplied to the main process for manufacturing chemical pulp.

Textile pieces made of purely filamentary materials, i.e. the pure fiber-constituents of the textile material, may be additionally processed in the following by mechanical processes (for example tearing, milling), such that the tissues, knitted fabrics, yarns, etc. which are contained in the fiber-constituents may be completely or partially separated to single fibers. Optionally, also a shortening of the fiber length may occur. A separation to single fibers is in particular advantageously in the case of mixed yarns. Here, different filamentary materials are physically connected to each other on yarn-level.

Also an exposure of microscopic non-filamentary constituents and non-fiber-constituents, respectively, may occur. For example, pigments which are incorporated in the fibers may be exposed, which may then be optionally separated in further procedures, for example by means of their physical properties.

Next, a mechanical separation of the filamentary constituents according to an exemplary embodiment is described.

After the disintegration of the textile materials and textile raw materials, respectively, in single fibers, by mechanical separation methods and disaggregation methods, respectively, cellulosic fibers and fiber materials, respectively, may be separated from non-cellulosic fibers and fiber materials, respectively. For this purpose, the single fibers may for example be suspended in a liquid medium, preferably an aqueous medium, and may be separated from each other by their physical properties, for example gravitationally and/or electrostatically and/or flotationally. Suspending the textile pieces which are singulated to single fibers in water may be performed in a mixing tank with a stirrer. For example, cotton fibers and polyester fibers may then be gravitationally separated from each other by means of their density difference. Additives, such as dispersing agents and/or swelling agents may be optionally but advantageously added to the liquid medium, in order to increase the separation efficiency of the respective method. For example, a chemical substance for reducing the surface tension of water may be added, to suppress a floating of the comminuted textile pieces. A mechanical separation may be performed in multiple stages for improving the separation effect.

Preferably, a gravitational separation may be performed by one or more hydro-cyclones (i.e. a centrifugal force separator) and/or in a flotation cell.

Thus, according to an embodiment, after stirring the suspension, it may be supplied to a hydro-cyclone, in which the textile pieces in the suspension which are in particular separated to single fibers, may be separated by different densities. Cellulose (in particular from cotton) has a higher density than polyethylene terephthalate (PET) which in turn comprises a higher density than elastane. For improving the separation efficiency, multiple hydro-cyclones may be connected in a cascade-like manner.

A mechanical separation of the fiber materials which, according to an embodiment, is performed alternatively or in addition to the treatment in at least one hydro-cyclone, may also be performed in a flotation cell. In a flotation cell, in particular the following procedures may be performed:
  a) generation of gas bubbles within the suspension
  b) contacting the gas bubbles with the fiber materials from the suspension
  c) agglomerating and adhering, respectively, the fiber materials to be separated to the gas bubbles
  d) letting the gas/solid body-combinations rise to a surface where they can be skimmed Due to their low density, in the flotation cell, the more lightweight PET- and elastane-particles will preferably rise and may be skimmed, whereas the more heavyweight cellulose particles remain in the flotation cell. The described treatment in a flotation cell may be performed continuously or batchwise.

An electrostatic separation of the fiber materials, which is possible alternatively or additionally, may be performed dry or in a wet-method.

Despite the preferred performance in multiple stages, in the mentioned embodiments of the invention, in some cases no complete separation of the materials can be achieved in a purely mechanical separation. In an embodiment, the starting material flow is separated to a mainly cellulosic flow (which predominantly comprises cellulose fibers) and a mainly non-cellulosic flow (which predominantly comprises non-cellulosic fibers), wherein in the cellulosic flow which is subsequently further processed to chemical pulp, non-cellulosic portions at first still can be specifically further depleted in a subsequent chemical separation. By the selection of suitable process parameters and the number of process stages, according to exemplary embodiments, it can be complied with a desired target range of non-cellulosic constituents.

Subsequently, according to an exemplary embodiment of the invention, a chemical processing (in particular cooking) of the cellulosic fiber flow is described.

In terms of the manufacture of chemical pulp and in particular its further use for manufacturing cellulosic regenerated molded bodies and the purity requirements connected therewith, according to exemplary embodiments of the invention, it is advantageously to accomplish a chemical separation from the predominantly cellulosic substance flow which is obtained after mechanically separating (i.e. the cellulosic fibers with low additives of other substances) by chemical methods and to thereby, quantitatively, if possible, remove the non-cellulosic constituents which are still contained therein. According to an exemplary embodiment of the invention, this may be achieved by chemical method steps. The aim of these method steps is the selective or preferred degradation of the non-cellulosic constituents.

According to an exemplary embodiment, also selectively solving a component of the fiber materials and subsequently filtering a non-solved component is possible. In an embodiment, the cellulosic fiber flow and the predominantly cellulosic fibers, respectively, may be made subject to an alkaline cooking. In this procedure, polyester may be split to the monomers ethylene glycol and terephtalic acid, for example. These are water-soluble and, according to an embodiment, may be separated from the cellulose fibers via process waste liquor. Parallel to the polyester degradation, in this cooking process, also cellulose degrading reactions may occur. According to an exemplary embodiment of the invention, by a suitable selection of the process parameters, the cellulose degradation may be controlled, such that a certain target-degree of polymerization is adjusted. This is advantageously, since the degree of polymerization of the cellulose (expressed as limiting viscosity number) is a specification criterion for chemical pulp.

With advantage, according to an embodiment, the alkaline cooking process may be supported by utilizing oxidizing agents.

According to an embodiment, preferably at the same time in this cooking process, certain portions of textile chemicals which are intrinsically contained in the starting materials (for example colorants) may be solved and degraded, respectively, and may be converted to soluble forms.

Thereafter, a bleaching procedure may further be performed, in order to remove or deactivate colorants.

In particular subsequently to the cooking, according to an embodiment of the invention, the cellulosic fiber flow (i.e. the fiber flow which predominantly contains cellulosic fibers and pulp, respectively) may be further processed in a bleaching sequence, preferably in multiple stages. The aim of such an advantageous bleaching sequence is the adjustment of a high degree of whiteness by a possibly complete removal and complete degradation, respectively, of all colorants and textile chemicals, respectively, which are still present. According to an embodiment, oxidative, reductive and/or enzymatic bleaching stages may be combined with each other. In a simple embodiment, a purely oxidative bleaching stage is utilizable with advantage.

According to an exemplary embodiment, a sequence A-Z-P may be applied with advantage. The A-stage (acidic washing) in particular serves for removing solved metal ions and for degrading textile chemicals which are not alkaline degradable. The Z-stage (ozone bleaching) serves on the one hand as highly oxidative stage for degrading the chromophores/colorants and at the same time as further stage for adjusting the limiting viscosity number. Then, the final P-stage (peroxide bleaching) in particular serves for fine adjusting the degree of polymerization (analog to the limiting viscosity number) and for achieving the desired final degree of whiteness. The described bleaching stages are optional: number and type of the bleaching stages and their concrete process conditions may be adapted in terms of respectively available materials and a respective application, respectively.

In particular, advantageously, reaction media and process chemicals may be guided in closed cycles. By an advantageous implementation of recovery processes, according to exemplary embodiments of the invention, the resource requirement (in particular in terms of chemicals, energy, water) of the entire processing process may be kept low.

Next, an embodiment of a regenerated molded body production, i.e. the manufacture of cellulosic molded bodies, on basis of the cellulose which is separated from the textile material is described.

By the selection of suitable raw materials and textile materials, respectively, suitable process parameters and the combination and mutual coordination of the described process steps, it is possible by means of the above described processing process, to manufacture chemical pulp from old textiles and textile wastes, respectively, as starting materials or textile materials. This chemical pulp may be utilized for the production of cellulosic regenerated molded bodies, in particular by the viscose-method and/or the lyocell-method (which in particular is performed on basis of NMMO solvent).

The quality of the obtained cellulosic regenerated molded bodies is equivalent of that which can be obtained when conventional wood-based chemical pulps are utilized.

FIG. 1 shows a flow diagram 50 of a method of reusing old clothes as textile material which comprises cellulose for manufacturing molded bodies 102 (see FIG. 2) from cellulose, according to an exemplary embodiment of the invention.

As textile material, an inhomogeneous textile material or mixed tissue in form of post-consumer old clothes is used which have been used and disposed by a consumer (see reference sign 52).

At first, as illustrated with reference sign 56, the textile material is comminuted in one or more guillotines and/or by shredding, preferably using cutting knives. Thereby, comminuted textile pieces in a size range between, for example, 0,5×0.5 cm$^2$ and 10×10 cm$^2$ are obtained.

Subsequently, separating 58 of non-fiber-constituents or textile pieces of the comminuted textile material with respect to fiber-constituents or textile pieces of the comminuted textile material is performed. As non-fiber-constituents, textile pieces with foreign matters, such as buttons, zip fasteners, seams and/or textile print may be separated. In more detail, from the comminuted textile pieces, those ones are removed which comprise a material or are characterized by a material which is different from fibers. Preferably, separating 58 the non-fiber-constituents from the fiber-constituents may be performed by a processing which separates the non-fiber-constituents due to different physical properties, compared with the fiber-constituents. For example, textile pieces made of or with metallic rivets or zip fasteners may be separated from the rest of the comminuted textile pieces by a metal separator. Plastic buttons may be separated from textile fiber-dominated textile pieces by gravitationally depositing, by using the different densities of the heterogeneous mixture of textile pieces (for example by centrifuging, filtering, etc.).

Subsequently, a further comminuting 60 of the separated non-fiber-constituents (which are predominantly not made of fibers) may be optionally performed. For example, the non-fiber-constituents may be again fragmented by a guillotine. Thereby, remains of fiber materials may be separated from the textile pieces which are dominated by non-fiber-constituents and may be resupplied to the reusing process. In other words, recovering 62 fiber residues (in form of further fiber-constituents) from the further comminuted predominantly non-fiber-constituents is performed. The recovered fiber residues may be resupplied to the fiber-constituents for a further extraction of cellulose, see reference sign 63.

Subsequently, for example by cutting mills, a further comminuting or separating 64 of the fiber-constituents and the optionally recovered fiber residues to single fibers may be performed. The mentioned constituents and textile pieces, respectively, may thus be comminuted to threads and these may then be comminuted to completely singulated fibers.

According to the described embodiment, subsequently, mechanically separating 66 non-cellulosic fibers (in particular synthetic fibers such as polyester, polyamide and elastane, respectively, which frequently occur in old textiles) of the fiber-constituents (inclusively the fiber residues) from cellulosic fibers of the fiber constituents is performed. Mechanically separating 66 may be performed in a different manner in different embodiments. For example, mechanically separating 66 may be performed based on density differences between the non-cellulosic fibers and the cellulosic fibers. Alternatively or additionally, mechanically separating 66 may be performed based on different electrostatic properties between the non-cellulosic fibers and the cellulosic fibers.

In the embodiment which is illustrated in FIG. 1, mechanically separating 66 comprises suspending 68 the fiber-constituents in an aqueous medium. In other words, the fiber-constituents are filled into a liquid container. Thereafter, separating 70 the non-cellulosic fibers from the cellulosic fibers in the aqueous medium is performed due to different flotational properties of the both mentioned constituents. Flotation is a physical-chemical separation method for fine-grained solids due to the different surface wettabilities of the particles. Advantageously, a dispersing agent and/or a swelling agent which increases the different physical properties of non-cellulosic fibers with respect to that of cellulosic fibers, which properties are used in the separation, may be added to the aqueous medium in which the here flotational separation is performed.

After this mechanically separating 66, with advantage a chemically separating 76 of another part of the non-cellulosic (in particular synthetic) fibers from the cellulosic fibers may be performed, in order to further increase the cellulose content of the extract. Also for the chemically separating 76, there are different possibilities.

In the described embodiment, chemically separating 76 may comprise selectively solving 72 exclusively the cellulosic fibers in a solvent (for example NMMO). In other words, the solvent may be selected, such that only the cellulosic fibers, but not the non-cellulosic (PET-) fibers, are solved therein in a noteworthy manner. This allows for a subsequently filtering of the non-cellulosic (PET-) fibers which are not solved, see reference sign 74.

In an especially preferred embodiment, chemically separating 76 comprises, after mechanically separating 66 (with or without interposition of the procedure according to the reference signs 72 and 74), an alkaline cooking by an alkaline solution using oxidizing agents (see reference sign 78).

During chemically separating 76, a converting 80 of non-cellulosic fibers to water-soluble substances may be performed. For example, polyester may be transferred to water-soluble monomers by an alkaline cooking. Then, solving 82 the water-soluble substances in an aqueous solvent may be performed. Subsequently, filtering non-solved cellulosic fibers from the solved substances may be performed (see reference sign 84).

After chemically separating 76, the method may be continued with a bleaching 86 of the chemically separated cellulosic fibers, in order to remove or deactivate colorants or the like. For example, bleaching 86 may be an oxidative bleaching. According to a preferred embodiment of the invention, bleaching 86 may comprise performing 88 an acidic washing, followed by performing 90 an ozone bleaching, in turn followed by performing 92 a peroxide bleaching. By means of bleaching 86, colorants and other chemical residual substances in the textile materials to be reused may be removed.

From the cellulosic material obtained therefrom, subsequently, by the lyocell-method (or alternatively by the viscose-method), cellulosic molded bodies 102 in form of fleece are generated (see reference sign 94).

Figure 2:
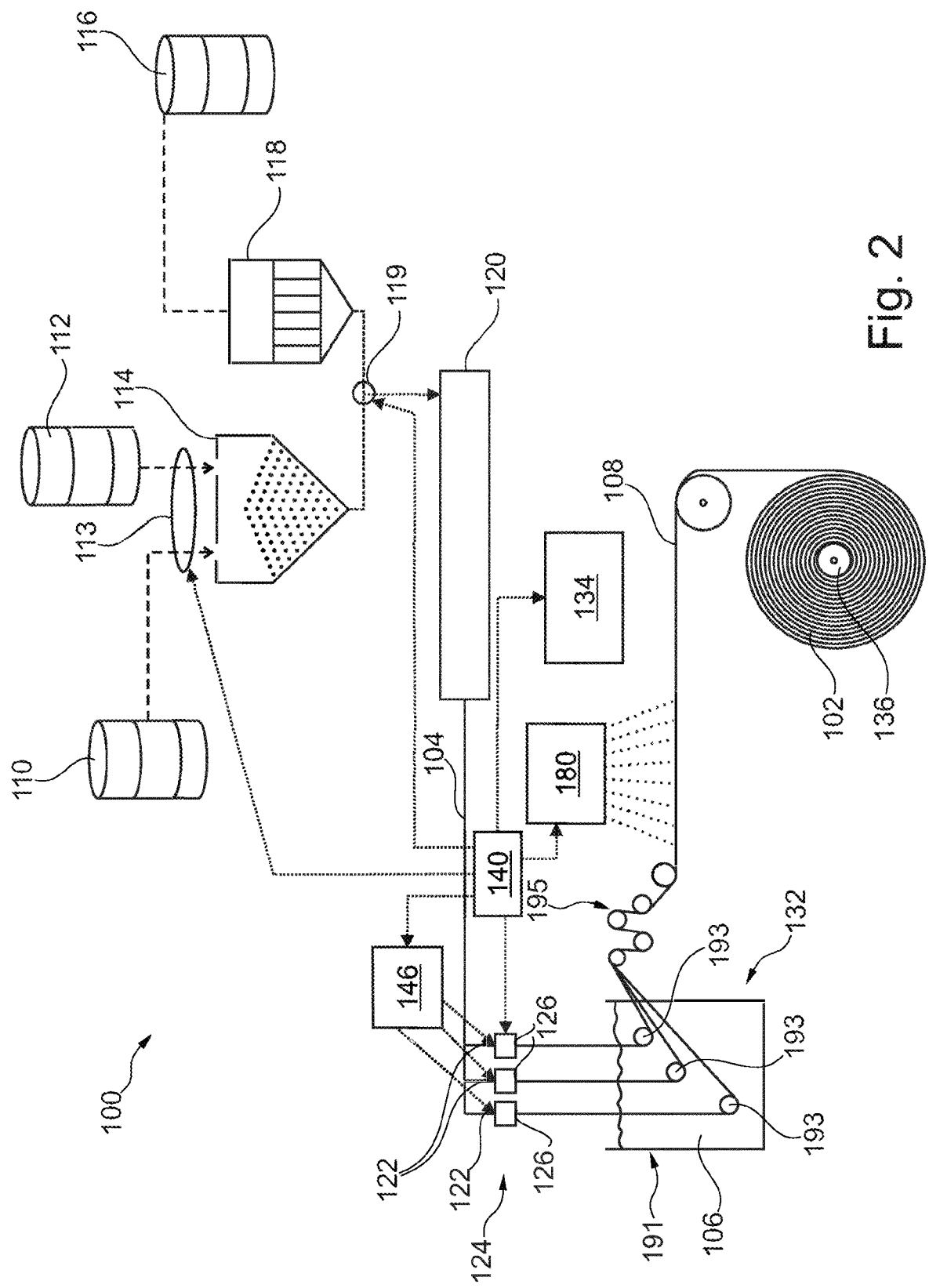
FIG. 2 shows a device of manufacturing a molded body which comprises cellulose, according to an exemplary embodiment of the invention.

For this purpose, directly solving 96 the cellulosic material which is obtained after bleaching 86, in a solvent 116 (compare FIG. 2, for example tertiary amine oxides, such as N-methylmorpholine-N-oxide (NMMO)) is performed, advantageously without further chemical pretreatment. In more detail, the mentioned material may be directly transferred in solution, whereby a spinning mass is formed. In this way, the manufacturing method and recycling method, respectively, may be performed extraordinarily simply and fast and ecologically. It has surprisingly turned out, that low portions of foreign matters (for example polyester and elastane, respectively) which remain in the recovered cellulosic material after the described procedure, do not disturb the lyocell-method and do not negatively influence the quality of the recovered lyocell-cellulose. In contrast, certain amounts of elastane may remain in the manufactured cellulose fibers without deteriorating their properties. For example, in a respective molded body, elastane may be present as foreign matter with at least 0,001 weight percent, in particular at least 0.01 weight percent, further in particular at least 1 weight percent, with respect to the total weight of the molded body. Also certain amounts of remaining polyester do not disturb the obtained product, but may even strengthen the mechanical integrity of the molded body 102 to be manufactured. For example, in a respective molded body, polyester may be present as foreign matter with at least 0,001 weight percent, in particular at least 0.01 weight percent, further in particular at least 1 weight percent, with respect to the total weight of the molded body.

After solving 96 the mentioned material in the solvent (preferably NMMO), the obtained lyocell-spinning solution may be pressed through one or more spinning nozzles, whereby threads and filaments, respectively, with a honey-like viscosity are generated (see block 97 concerning this spinning and extruding, respectively).

During and/or after the falling of these threads and filaments, respectively, these are brought in operational connection with an aqueous environment and therefore diluted. Thereby, the concentration of the solvent 116 of the threads and filaments, respectively, is reduced in air humidity and an aqueous liquid bath, respectively, to such an extent that the lyocell-spinning solution is transferred to a solid phase made of cellulose-filaments. In other words, a precipitating, depositing or coagulating of the cellulose-filaments occurs, see reference sign 98. Thereby, a preform of the molded body 102 is obtained. Thus, extruding 97 the spinning mass to molded bodies 102 is performed by means of precipitating 98 in a spinning bath (see reference sign 191 in FIG. 2).

Furthermore, the method may comprise a postprocessing 99 of the precipitated molded bodies 102. Such a postprocessing 99 may for example encompass drying, impregnating and/or reshaping the obtained molded bodies 102. For example, the molded body 102 may be processed to fibers, a foil, a tissue, a fleece, a sphere, a porous sponge, or beads by the described manufacturing method and may then be supplied to a further use. The procedures corresponding to generating 94 the molded bodies 102 may be performed by the device 100 illustrated in FIG. 2. For this purpose, as starting material 110, the material which comprises cellulose is utilized which is obtained after bleaching 86.

Thus, FIG. 2 shows a device 100 according to an exemplary embodiment of the invention for manufacturing a cellulose-comprising molded body 102 which may be manufactured in form of a fleece (nonwoven), as fiber, foil, sphere, textile tissue, sponge, or in form of beads or flakes, for example. According to FIG. 2, the molded body 102 is manufactured directly from a spinning solution 104. The latter is converted to cellulose fibers 108 as molded body 102 by means of a coagulation-fluid 106 (in particular made of air humidity) and/or a coagulation-bath 191 (for example a water bath which optionally comprises tertiary amine oxides such as N-methylmorpholine-N-oxide (NMMO)). By means of the device 100, a lyocell-method may be performed. In this way, substantially endless filaments or fibers 108 or mixtures of substantially endless filaments and fibers 108 with a discrete length may be manufactured as molded body 102, for example. A plurality of nozzles which respectively have one or more openings 126 (which may be also denoted as spinning holes) are provided for ejecting the lyocell-spinning solution 104.

As can be taken from FIG. 2, a starting material 110 which is based on cellulose may be supplied to a storage tank 114 via a dosing device 113.

According to an embodiment, a water ingress in the cellulose-based starting material 110 may occur by a solvent 116 (in particular NMMO) which is described in more detail below. Furthermore, the cellulose-based starting material 110 itself may contain a certain residual moisture (dry pulp frequently has a residual moisture of 5 weight percent to 8 weight percent, for example). In particular, according to the described embodiment, the starting material 110 may be directly supplied to a mixture of water and solvent 116 without pre-moistening. An optional water container 112 which is shown in FIG. 2 may then be omitted.

According to an alternative embodiment, the starting material 110 which is comprising cellulose may be additionally moistened, in order to therefore provide moist cellulose. For this purpose, water from an optional water container 112 may be supplied to the storage tank 114 via the dosing device 113. Therefore, the dosing device 113 which is controlled by a control device 140 may supply adjustable relative amounts of water and starting material 110 to the storage tank 114.

A suitable solvent 116, preferably tertiary amine oxides such as N-methylmorpholine-N-oxide (NMMO) and an aqueous mixture of the solvent 116, respectively, for example a 76% solution of NMMO in water, is contained in a solvent container. The concentration of the solvent 116 may be adjusted in a concentrating device 118 either by supplying pure solvent or water. The solvent 116 may then be mixed with the starting material 110 with definable relative amounts in a mixing unit 119. Also the mixing unit 119 may be controlled by the control unit 140. Thereby, the cellulose-comprising starting material 110 is solved in the concentrated solvent 116 in a solving device 120 with adjustable relative amounts, whereby the lyocell-spinning solution 104 is obtained. The relative concentration ranges (also denoted as spinning window) of the components starting material 110, water and solvent 116 in the spinning solution 104 for manufacturing cellulosic regenerated molded bodies according to the lyocell-method may be suitably adjusted as known to a person skilled in the art.

The lyocell-spinning solution 104 is supplied to a fiber generating device 124 (which may be configured with a number of spinning beams or jets 122).

When the lyocell-spinning solution 104 is guided through the openings 126 of the jets 122, it is separated into a plurality of parallel threads made of the lyocell-spinning solution 104. The described process flow transforms the lyocell-spinning solution 104 to increasingly long and thin threads whose properties may be adjusted by a corresponding adjustment of the process conditions, controlled by the control unit 140. Optionally, a gas flow may accelerate the lyocell-spinning solution 104 on its way from the openings 126 to a fiber receiving unit 132.

After the lyocell-spinning solution 104 has moved through the jets 122 and further downwards, the long and thin threads of the lyocell-spinning solution 104 interact with the coagulation-fluid 106.

In the interaction with the coagulation-fluid 106 (for example water), the solvent concentration of the lyocell-spinning solution 104 is reduced, such that the cellulose of the starting material 110 at least partially coagulates and precipitates, respectively, as long and thin cellulose fibers 108 (which may still contain residues of solvent and water).

During or after the initial formation of the individual cellulose fibers 108 from the extruded lyocell-spinning solution 104, the cellulose fibers 108 are received at the fiber receiving unit 132. The cellulose fibers 108 may immerse into the coagulation-bath 191 shown in FIG. 2 (for example a water bath optionally comprising a solvent such as NMMO) and may complete their precipitation when interacting with a liquid of the coagulation-bath 191. Depending on the process adjustment of the coagulation, the cellulose may form cellulose fibers 108 (as shown, wherein the cellulose fibers 108 may be made of one substance and integrally merged with each other ("merging"), respectively, or may be present as separated cellulose fibers 108), or a foil and a film, respectively, made of cellulose may form at the fiber receiving unit 132 (not illustrated in FIG. 2).

Thus, the cellulose fibers 108 are extruded out of the spinning nozzles of the jets 122 and are guided through the spinning bath and coagulation-bath 191, respectively (for example containing water and NMMO in low concentration for precipitation/coagulation), wherein the cellulose fibers 108 are guided around a respective deflection roll 193 in the coagulation-bath 191 and are supplied to a draw-off godet 195 outside the coagulation-bath 191. The draw-off godet 195 serves for further transport and post-stretching of the cellulose fibers 108, in order to achieve a desired titer. Downstream the draw-off godet 195, the fiber bundle made of the cellulose fibers 108 is washed in a washing unit 180, optionally scrooped and subsequently cut (not shown).

Although not illustrated in FIG. 2, the solvent 116 of the lyocell-spinning solution 104 which is removed from the cellulose fibers 108 when coagulating and in a subsequent washing in the washing unit 180, may at least partially be recovered and recycled, respectively, and may be transferred back to the storage tank 114 in a subsequent cycle.

During the transport along the fiber receiving unit 132, the molded body 102 (here in form of the cellulose fibers 108) may be washed by means of the washing unit 180, as the latter supplies a washing liquid for removing solvent residues. Thereafter, the molded body 102 may be dried.

Moreover, the molded body 102 may be made subject to a posttreatment, see the schematically illustrated posttreatment unit 134. For example, such a posttreatment may comprise a hydro-entangling, a posttreatment, a needle treatment, an impregnation, a steam treatment with a steam which is supplied under pressure and/or a calendaring, etc.

The fiber receiving unit 132 may supply the molded body 102 to a winding device 136, at which the molded body 102 may be winded. The molded body 102 may then be supplied as rolling freight to an entity which manufactures products such as wipes or textiles on basis of the molded body 102.

Figure 3:
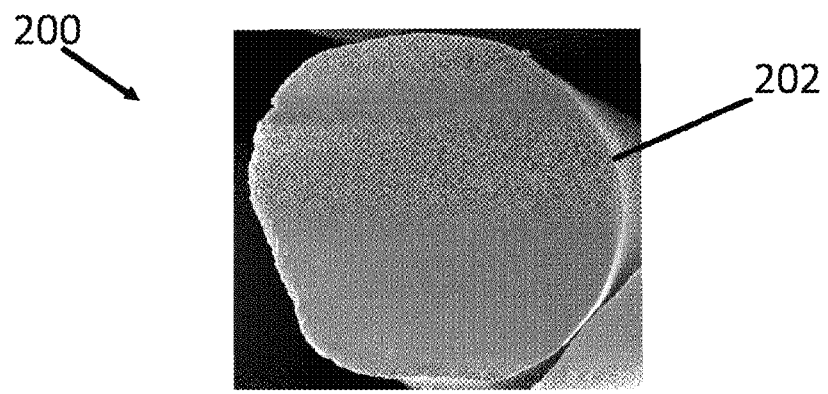
FIG. 3 shows a cellulose fiber which is manufactured by a lyocell-method.

FIG. 3 shows a cellulose fiber 200 which is manufactured by means of a lyocell-method in cross-section. The cellulose fiber 200 which is manufactured by means of a lyocell-method has a smooth round outer surface 202 and is homogenous and free from macroscopic holes, filled with cellulose material. Therefore, it can be unambiguously distinguished from cellulose fibers which are manufactured by means of a viscose-method (see reference sign 204 in FIG. 4) and from cellulose fibers of cotton plants (see reference sign 206 in FIG. 5) by a person skilled in the art.

Figure 4:
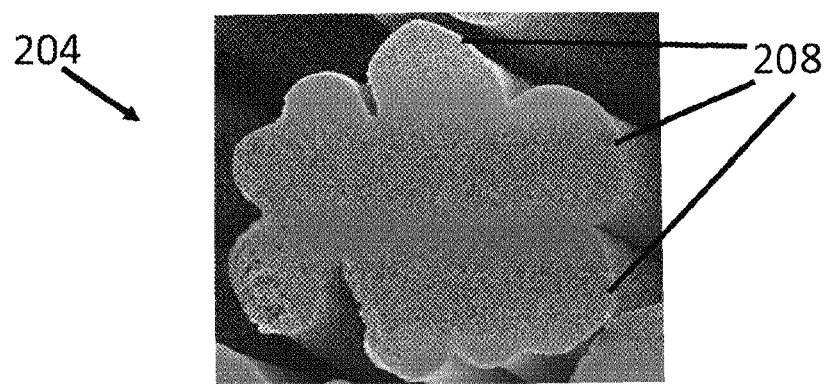
FIG. 4 shows a cellulose fiber which is manufactured by a viscose-method.

FIG. 4 shows a cellulose fiber 204 which is manufactured by means of a viscose-method in cross-section. The cellulose fiber 204 is cloud-shaped and comprises a plurality of arc-shaped structures 208 along its outer circumference.

Figure 5:
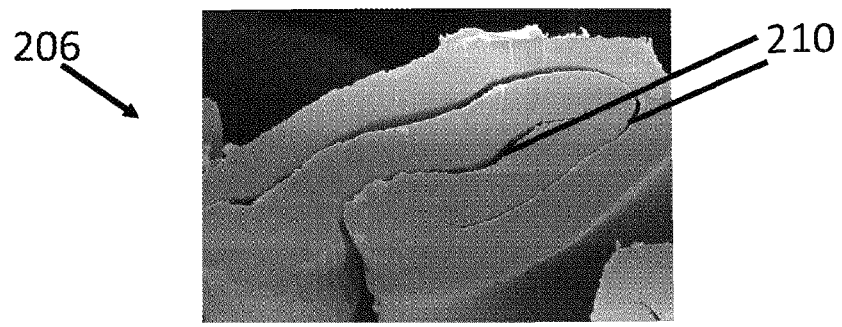
FIG. 5 shows a natural cellulose fiber of a cotton plant.

FIG. 5 shows a natural cellulose fiber 206 of a cotton plant in cross-section. The cellulose fiber 206 is kidney-shaped and comprises a lumen 210 which is free from material as a fully circumferentially enclosed hollow in an interior.

By means of the significant geometric and structural, respectively, differences of the fibers according to FIG. 3 to FIG. 5, it is possible for a person skilled in the art to unambiguously determine, for example by means of a microscope, if a cellulose fiber is formed by means of the lyocell-method, by means of the viscose-method, or naturally in a cotton plant.

In addition, it should be noted that "comprising" does not exclude other elements or steps and "a" or "an" does not exclude a multiplicity. Furthermore, it should be noted that features or steps which are described with reference to one of the above embodiments may also be used in combination with other features or steps of other above described embodiments. Reference signs in the claims shall not be construed as a limitation.

What is claimed is:

1. A method of generating a chemical pulp from a textile material which comprises cellulose for manufacturing regenerated cellulosic molded bodies, wherein the method comprises:

comminuting the textile material;

separating at least a part of non-fiber-constituents of the comminuted textile material from fiber-constituents of the comminuted textile material;

mechanically separating at least a part of non-cellulosic fibers of the fiber-constituents from cellulosic fibers of the fiber-constituents, and subsequently chemically separating at least a further part of the non-cellulosic fibers from the cellulosic fibers.

2. The method of claim 1 further comprising generating molded bodies from the chemical pulp based on the cellulosic fibers after the mechanically separating and the chemically separating.

3. The method according to claim 1, comprising at least one of the following features:
   wherein comminuting the textile material comprises shredding;
   wherein in separating the at least a part of non-fiber-constituents, foreign matters of a group are separated from the rest of the textile material, which group is consisting of buttons, zip fasteners, seams, and textile print;
   wherein separating the non-fiber-constituents from the fiber-constituents is performed due to different physical properties;
   wherein mechanically separating is performed based on density differences between the non-cellulosic fibers and the cellulosic fibers;
   wherein mechanically separating is performed based on different electrostatic properties between the non-cellulosic fibers and the cellulosic fibers.

4. The method according to claim 1, wherein mechanically separating comprises:
   suspending the fiber-constituents in a liquid medium;
   separating the non-cellulosic fibers from the cellulosic fibers due to different physical properties in the liquid medium centrifugal force-related, flotational and/or electrostatic properties.

5. The method according to claim 4, wherein the liquid medium comprises at least one additive for increasing the different physical properties of non-cellulosic fibers and cellulosic fibers.

6. The method according to claim 1, wherein chemically separating comprises:
   selectively solving only at least a part of the non-cellulosic fibers or only at least a part of the cellulosic fibers in a solvent;
   separating at least a part of the non-solved fiber-constituents.

7. The method according to claim 1, wherein chemically separating comprises:
   supplying an alkaline solution.

8. The method according to claim 7, wherein supplying the alkaline solution is performed for degrading non-cellulosic fibers.

9. The method according to claim 2, comprising at least one of the following features:
   wherein chemically separating comprises:
      converting at least a part of the non-cellulosic fibers to soluble substances,
      solving the soluble substances in a solvent, and
      separating non-solved cellulosic fibers from the solved substances;
   wherein mechanically separating and/or chemically separating comprises separating synthetic fibers as non-cellulosic fibers;
   wherein generating the molded bodies is performed based on the cellulosic fibers by the lyocell-method or by the viscose-method.

10. The method according to claim 2, wherein generating the molded bodies from the chemical pulp comprises:
    solving the cellulosic fibers in a solvent and transferring the solved cellulosic fibers in a spinning mass;
    extruding the spinning mass through spinning nozzles and subsequently precipitating in a spinning bath.

11. The method according to claim 9, comprising at least one of the following features:
    wherein solving the cellulosic fibers is performed by a direct solving method and/or by tertiary amine oxides as solvent;
    wherein precipitating in a spinning bath is caused by an aqueous milieu.

12. The method according to claim 1, wherein the method comprises bleaching the chemically separated cellulosic fibers.

13. The method according to claim 12, wherein bleaching comprises at least one of a group which is consisting of an oxidative bleaching, a reductive bleaching, and an enzymatic bleaching.

14. The method according to claim 12, wherein the bleaching comprises performing acidic washing.

15. A method of generating a chemical pulp from a textile material which comprises cellulose, wherein the method comprises the steps of:
    comminuting the textile material;
    separating at least a part of non-fiber-constituents of the comminuted textile material from fiber-constituents of the comminuted textile material;
    mechanically separating at least a part of non-cellulosic fibers of the fiber-constituents from cellulosic fibers of the fiber-constituents, and subsequently
    chemically separating at least a further part of the non-cellulosic fibers from the cellulosic fibers;
    wherein after separating at least a part of the non-fiber-constituents, further comprises:
    further comminuting the separated non-fiber-constituents;
    recovering fiber residues from the further comminuted non-fiber-constituents; and
    supplying the recovered fiber residues to the fiber-constituents and/or to mechanically separating.

16. The method of claim 15 further comprising the step of generating molded bodies from the chemical pulp based on the cellulosic fibers after the mechanically separating and the chemically separating steps.

17. The method according to claim 10, comprising at least one of the following features:
    wherein the method, prior to mechanically separating, comprises separating the fiber-constituents to single fibers;
    wherein the method comprises postprocessing the precipitated molded bodies;
    wherein in the method at most a part of the non-cellulosic fibers from the textile material is co-used for manufacturing the molded bodies;
    wherein an inhomogeneous textile material is used as textile material;
    wherein the textile material comprises or consists of remains from a clothing manufacture and/or old clothes;
    wherein a molded body is a fiber, a foil, a sponge, a sphere or a bead;
    wherein the method comprises further processing the molded bodies to a product.

* * * * *

UNITED STATES PATENT AND TRADEMARK OFFICE
CERTIFICATE OF CORRECTION

PATENT NO. : 11,828,005 B2
APPLICATION NO. : 18/073941
DATED : November 28, 2023
INVENTOR(S) : Christoph Klaus-Nietrost, Richard Herchl and Christian Weilach Page 1 of 1

It is certified that error appears in the above-identified patent and that said Letters Patent is hereby corrected as shown below:

In the Specification

Column 15, Line 50     Delete "0,5×0.5 cm$^2$"
                                   Insert --0,5×0,5 cm$^2$--

Signed and Sealed this
Twenty-seventh Day of February, 2024

Katherine Kelly Vidal
*Director of the United States Patent and Trademark Office*